US012126111B2

(12) United States Patent
Zier

(10) Patent No.: US 12,126,111 B2

(45) Date of Patent: Oct. 22, 2024

(54) MODULAR CIRCUIT BOARD PLUG CONNECTOR

(71) Applicant: HARTING Electric Stiftung & Co. KG, Espelkamp (DE)

(72) Inventor: Sergej Zier, Loehne (DE)

(73) Assignee: HARTING Electric Stiftung & Co. KG, Espelkamp (DE)

( * ) Notice: Subject to any disclaimer, the term of this patent is extended or adjusted under 35 U.S.C. 154(b) by 542 days.

(21) Appl. No.: 17/615,070

(22) PCT Filed: May 27, 2020

(86) PCT No.: PCT/DE2020/100449

§ 371 (c)(1),
(2) Date: Nov. 29, 2021

(87) PCT Pub. No.: WO2020/244706

PCT Pub. Date: Dec. 10, 2020

(65) Prior Publication Data

US 2022/0224042 A1 Jul. 14, 2022

(30) Foreign Application Priority Data

Jun. 5, 2019 (DE) ..................... 10 2019 115 177.5

(51) Int. Cl.

*H01R 13/518* (2006.01)
*H01R 25/00* (2006.01)
*H01R 27/02* (2006.01)

(52) U.S. Cl.

CPC ........... *H01R 13/518* (2013.01); *H01R 25/00* (2013.01); *H01R 27/02* (2013.01)

(58) Field of Classification Search

CPC .... H01R 13/46; H01R 13/516; H01R 13/518; H01R 25/00; H01R 25/003; H01R 27/00; H01R 27/02

USPC .......................................................... 439/638

See application file for complete search history.

(56) References Cited

U.S. PATENT DOCUMENTS

| | | | |
|---|---|---|---|
| 4,753,613 | A | 6/1988 | Morgan |
| 5,108,313 | A | 4/1992 | Adams |
| 5,924,898 | A | 7/1999 | Dutton et al. |
| 6,004,163 | A | 12/1999 | Behling et al. |
| 6,231,392 | B1 | 5/2001 | Woensel |
| 6,346,009 | B1 | 2/2002 | Lin |
| 6,383,036 | B1 | 5/2002 | Steinhauser et al. |
| 7,762,846 | B1 | 7/2010 | Whiteman, Jr. et al. |
| 2003/0194914 | A1 | 10/2003 | Duck et al. |
| 2011/0034065 | A1 | 2/2011 | Busse et al. |
| 2011/0165798 | A1 | 7/2011 | Derks et al. |
| 2014/0273585 | A1 | 9/2014 | Dang |

(Continued)

FOREIGN PATENT DOCUMENTS

| | | | |
|---|---|---|---|
| CN | 101496231 | B | 5/2012 |
| DE | 29602740 | U1 | 4/1996 |
| DE | 69812262 | | 12/2003 |

(Continued)

*Primary Examiner* — Khiem M Nguyen

(74) *Attorney, Agent, or Firm* — Smartpat PLC

(57) ABSTRACT

A circuit board plug connector (1) has at least a first housing part (2) and a second housing part (3), which can be joined together to form a connector housing. The circuit board plug connector (1) has at least two similar and/or different connector modules (4, 4'). The connector modules (4, 4') are held by the joined housing parts (2, 3) in the connector housing for plug-in connection.

8 Claims, 3 Drawing Sheets

(56) References Cited

U.S. PATENT DOCUMENTS

| | | | |
|---|---|---|---|
| 2020/0176918 | A1 | 6/2020 | Wolf |

FOREIGN PATENT DOCUMENTS

| | | | |
|---|---|---|---|
| DE | 102017119287 | A1 | 2/2019 |
| EP | 1353412 | B1 | 5/2009 |
| FR | 2781092 | B1 | 10/2000 |
| RU | 2231185 | C2 | 6/2004 |
| RU | 2322740 | C1 | 4/2008 |
| WO | 2018206048 | A1 | 11/2018 |

MODULAR CIRCUIT BOARD PLUG CONNECTOR

TECHNICAL FIELD

The disclosure relates to a modular circuit board plug connector. Plug connectors of this type are provided for establishing an electrical and/or data connection to a circuit board. Circuit board plug connectors are plugged to plug connectors arranged on a circuit board.

BACKGROUND

DE 10 2017 119 287 A1 discloses a modular plug connector for mounting on a circuit board. The plug connector can be composed of a plurality of plug connector modules, wherein each plug connector module consists of at least one housing. The plug connector modules have a plug-in side and a terminal side, wherein the terminal side can generally be mounted on the circuit board. The plug-in side serves for electrical connection to a compatible circuit board plug connector. The contact elements of the plug connector modules are generally soldered to traces of a circuit board. The modular structure of the plug connector enables favorable production with relatively few parts.

A heavy plug connector with a modular structure is known from EP 1 353 412 B1. In this case, various replaceable plug connector modules can be inserted in a folding retaining frame made of two parts. The equipped retaining frame can in turn be inserted into a metal housing. The modularity is known to be of great advantage in such a plug connector. A plug connector of this type is, however, not suited for contacting a plug connector mounted (soldered) on a circuit board because its design is too bulky and also too heavy.

In the priority application for the present application, the German Patent and Trademark Office has searched the following prior art: DE 10 2017 119 287 A1, DE 296 03 740 U1, DE 698 12 262 T2, U.S. Pat. Nos. 4,753,613 A, 5,924,898 A, and EP 1 353 412 B1.

SUMMARY

An object of the disclosure is to provide a modular circuit board plug connector which can be used flexibly and is suited for a circuit board plug connection. At the same time, it is intended that the circuit board plug connector can be produced cost-effectively.

The object is achieved by the subject of the independent claims.

Advantageous embodiments of the invention are provided in the dependent claims and the following description.

The modular circuit board plug connector consists at least of a first housing part and a second housing part. The housing parts can be joined together to form a plug connector housing. The housing parts can be fixed to each other reversibly via a snap-fit connection and/or a screw connection.

The circuit board plug connector is a plug connector with a modular structure. This means that the plug connector is composed of a plurality of identical or alternatively different plug connector modules. They consist of a module housing into which a desired contact element can be inserted. The type of contact elements depends on the field of use of the plug connector module or the plug connector. The circuit board plug connector has at least two plug connector modules. The plug connector modules are constructed such that they can be plugged to the plug connector modules of DE 10 2017 119 287 A1. There is consequently a great cost advantage.

The plug connector modules are retained in the plug connector housing in a pluggable fashion by the housing parts which are joined together or fixed to each other. Pluggable means that the plug connector modules are retained firmly and stably in the plug connector housing in such a way that they can be plugged to a corresponding mating plug connector (module).

The plug connector modules preferably have an essentially cuboid design. The plug connector modules have a plug-in side which faces the mating plug connector. The terminal side of the plug connector modules is arranged on the opposite side. The individual conductors of a connected cable are here connected to the contact elements of the plug connector modules. The plug connector modules each have at least one groove on two opposite surfaces. The groove or the grooves are in each case arranged on a surface which is oriented perpendicular to the plug-in side.

The housing parts advantageously each have a continuous and/or segmented web on the plug-in side. If the housing parts are manufactured in an injection-molding process, such a web can be provided directly in the manufacturing process.

The abovementioned grooves and webs form the locking system for the plug connector modules in the circuit board plug connector. The webs of the housing parts each engage in the at least one groove of the respective plug connector modules. The plug connector modules are fixed or retained reversibly in the circuit board plug connector by the fixing of the housing parts to each other.

The circuit board plug connector has fixing arms on its narrow sides. The circuit board plug connector can be fixed reversibly to a mating plug connector arranged on a circuit board by means of these fixing arms so that the plug connection cannot be separated accidentally.

It is advantageous if the fixing arms can move orthogonally to the plug-in direction on the plug-in side. The fixing arms have an elongated design and extend beyond the narrow sides of the circuit board plug connector.

The fixing arms are integrally formed or mounted approximately centrally on the plug connector housing or on the housing part in a resilient fashion. On the terminal side, the fixing arms each have a pressure plate which can be pressed toward each other. The fixing arms thus move apart from each other on the plug-in side such that the circuit board plug connector can be separated from its mating plug connector. During the plugging process, the fixing arms slide automatically over the mating plug connector. However, prior pressing of the abovedescribed pressure plates can also be advantageous during the plugging process.

The fixing arms can advantageously be integrally formed only on one housing part. The second housing part can then be designed without fixing arms. Such a configuration has manufacturing advantages.

In a particularly preferred alternative embodiment, the housing parts are each made from plastic. Such an alternative embodiment can not only be produced cost-effectively but at the same time enables the integral formation of the movable fixing arms during the injection-molding production methods for the housing parts.

BRIEF DESCRIPTION OF THE DRAWINGS

An exemplary embodiment of the invention is shown in the drawings and explained in detail below. In the drawings.

DETAILED DESCRIPTION

The drawings contain partially simplified, schematic views. Identical reference symbols are in part used for the same but possibly not identical elements. Different views of the same elements could be at different scales.

Figure 1:
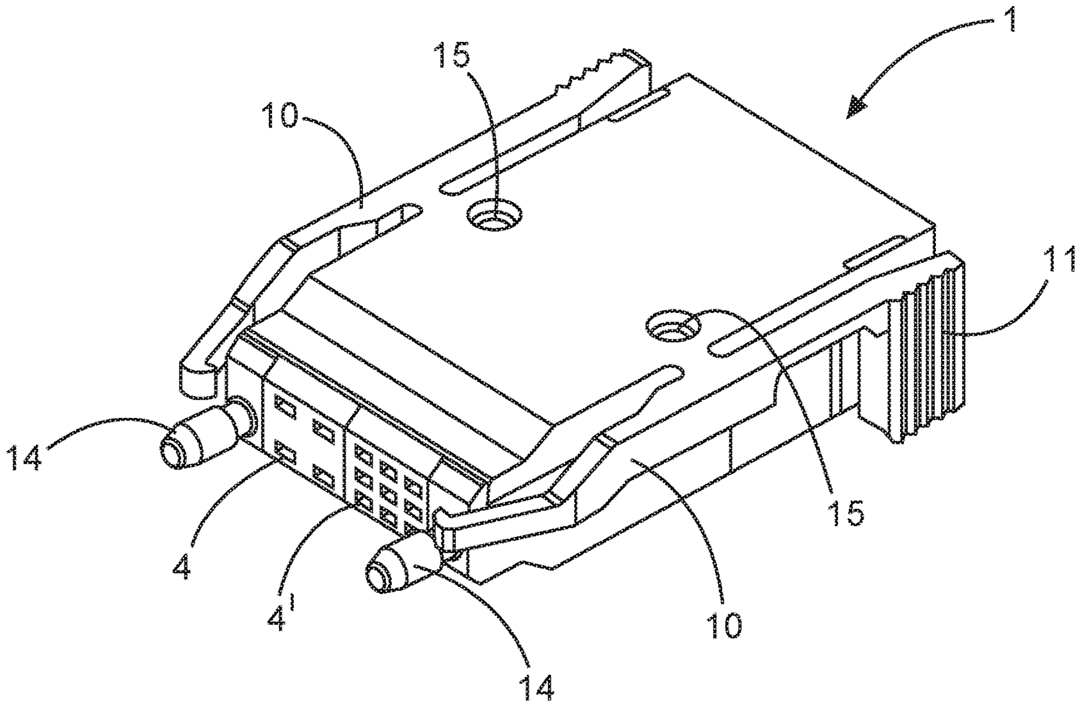
FIG. 1 shows a perspective view of a circuit board plug connector.
Figure 2:
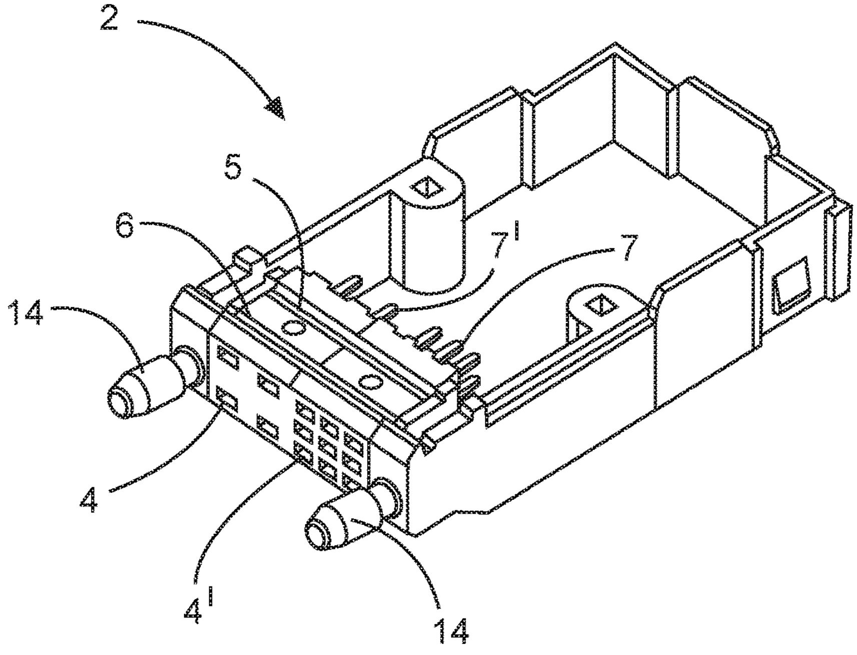
FIG. 2 shows a perspective view of a first housing part of the circuit board plug connector.
Figure 3:
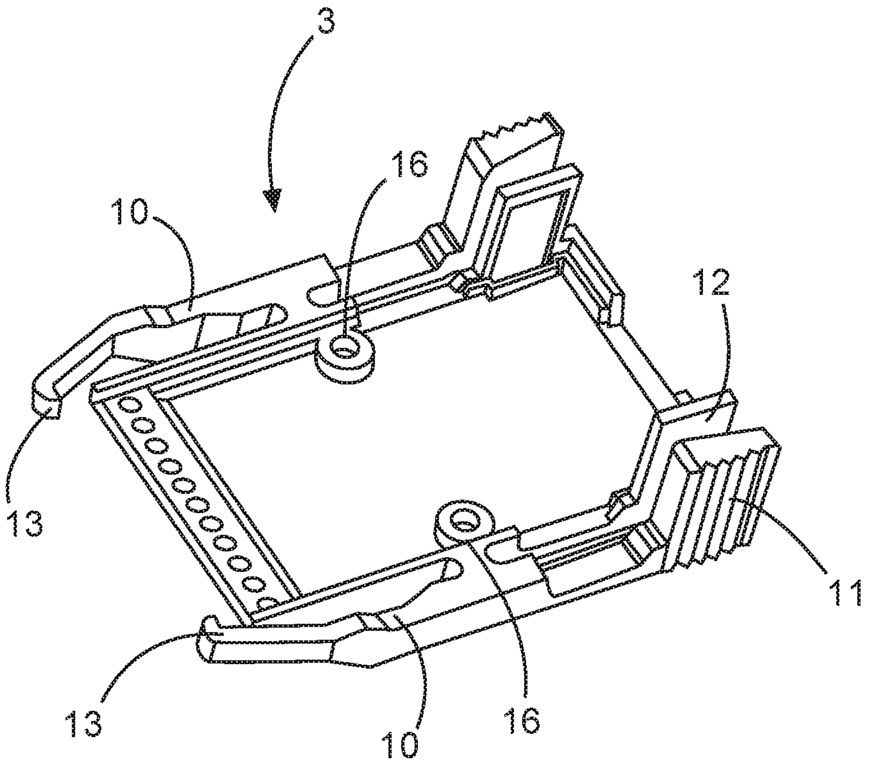
FIG. 3 shows a perspective view of a second housing part of the circuit board plug connector.
Figure 4:
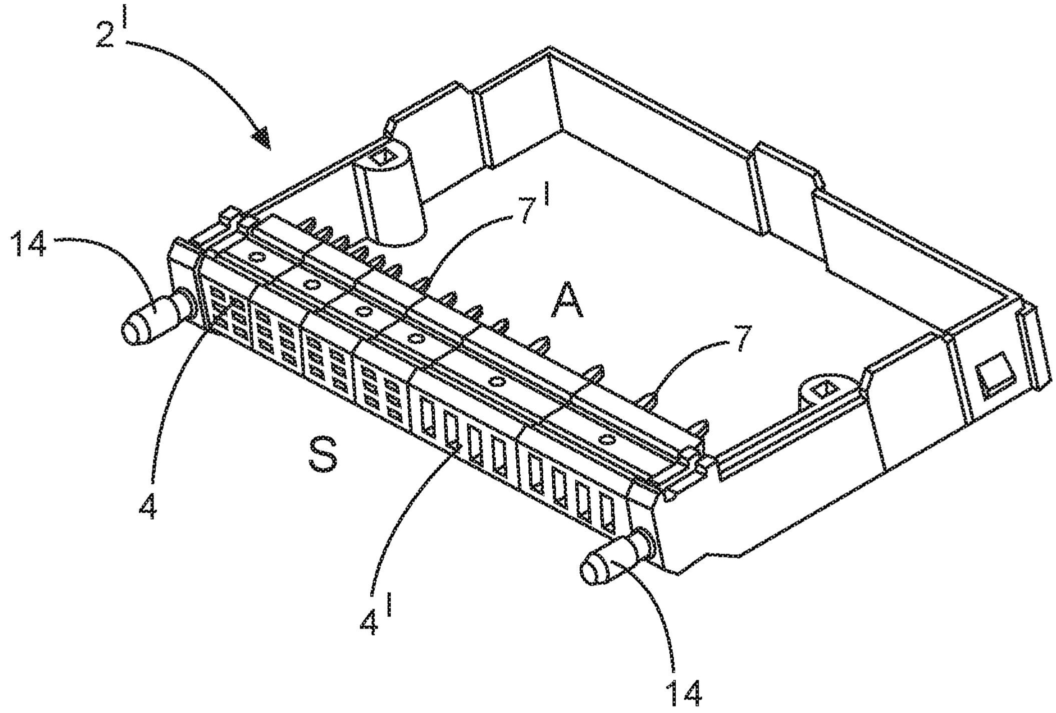
FIG. 4 shows a perspective view of a first housing part of a second embodiment of a circuit board plug connector.

FIG. 1 shows a perspective view of a circuit board plug connector 1. The circuit board plug connector 1 has a first housing part 2, 2' which is shown in perspective in FIGS. 2 and 4. The first housing parts 2, 2' shown in FIGS. 2 and 4 form the basis for different embodiments of the circuit board plug connector 1. The embodiments differ essentially in the number of plug connector modules 4, 4' which can be accommodated therein and hence in their plugging width.

The plug connector modules 4, 4' have an essentially cuboid design. The plug connector modules 4, 4' have a plug-in side S and a terminal side A. The contact elements 7, 7' of the plug connector modules 4, 4' are brought into plugging contact with contact elements of a mating plug connector (not visible) by means of the plug-in side S. The contact elements 7, 7' are each connected to a conductor of a connected cable (not shown) on the terminal side A. The plug connector modules 5 in each case have two grooves 5, 6 on two opposite sides.

Figure 5:
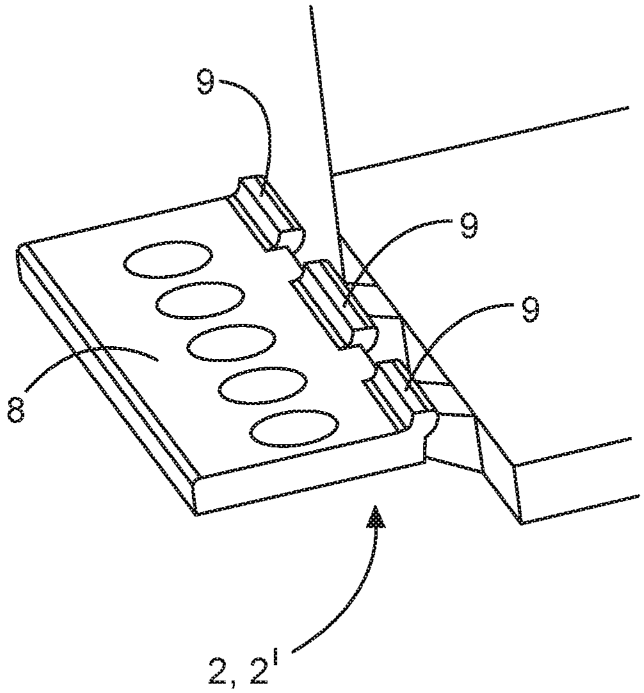
FIG. 5 shows an enlarged perspective portion of the first housing part in the fixing region for the plug connector modules.

The plug-in region of the first housing part 2, 2' is shown in a detailed view in FIG. 5. On the plug-in side, the first housing part 2, 2' has a bearing surface 8 on which the plug connector modules 4, 4' can be placed next to one another. A segmented web 9 is arranged on the edge of the bearing surface 8. The segmented web 9 engages in the rear groove 5 of the plug connector module 4, 4'.

Figure 6:
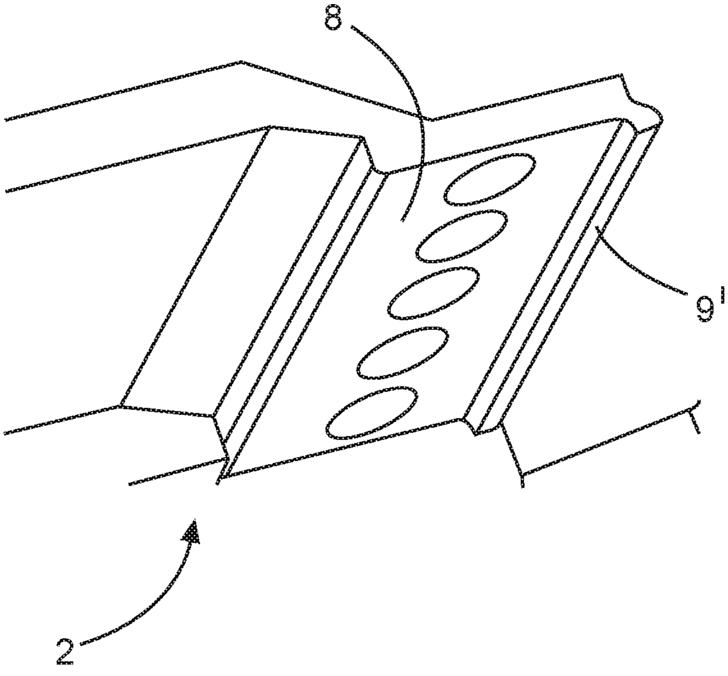
FIG. 6 shows an enlarged perspective portion of the second housing part in the fixing region for the plug connector modules.

The plug-in region of the second housing part 3 is shown in a detailed view in FIG. 6. On the plug-in side, the second housing part 3 has a bearing surface 8' which is pressed against the plug connector modules 4, 4' arranged side by side in the assembled state. The continuous web 9' here engages in the front groove 6 of the plug connector modules 4, 4'.

The circuit board plug connector 1 has in each case one fixing arm 10 on its narrow sides. The fixing arms 10 extend beyond the plug connector housing on the plug-in side and there have fixing hooks 13 at their ends for reversible fastening to a mating plug connector (not shown). The fixing arms 10 are integrally formed on the second housing part 3 approximately centrally and are attached or mounted resiliently on the plug connector housing via the integrally formed part. On the terminal side, the fixing arms 10 each have a pressure plate 11. The pressure plate 11 can be pressed against a bearing surface 12. As a result, the fixing arms 10 widen out on the plug-in side and the fixing hooks move out of the effective region of the mating plug connector (not shown) such that the plug connection between the circuit board plug connector 1 and the mating plug connector can be released.

On the plug-in side, the circuit board plug connector 1 has guide webs 14 pointing in the plug-in direction. As a result, orientation of the circuit board plug connector 1 relative to the mating plug connector so that there is a precise fit is ensured during the plugging process.

The circuit board plug connector 1 can be equipped with different and/or similar plug connector modules 4, 4' as follows: the plug connector modules 4, 4' are first arranged side by side and one after the other on the bearing surface 8 of the first housing part 2. The rear groove 5 is here first placed on the segmented web 9 at an angle and the respective plug connector module 4, 4' is then pressed onto the bearing surface 8. This process is repeated until the required number of plug connector modules 4, 4' is situated in the first housing part 2.

The continuous web 9' of the second housing part 3 is then guided into the front groove 6 of the plug connector modules 4, 4' arranged side by side. The second housing part 3 is then pressed onto the first housing part. The two housing parts 2, 3 can be fixed to each other via screw and threaded orifices 15, 16, as a result of which the plug connector modules 4, 4' are simultaneously also fixed in the circuit board plug connector 1.

Even if different aspects or features of the invention in the drawings are each shown in combination, unless otherwise stated it is apparent to a person skilled in the art that the illustrated and discussed combinations are not the only possible ones. In particular, mutually corresponding units or aggregations of features from different exemplary embodiments can be interchanged.

The articles “a” and “an” as used in this application and the appended claims should generally be construed to mean “one or more” unless specified otherwise or clear from context to be directed to a singular form.

LIST OF REFERENCE SYMBOLS

1 circuit board plug connector
2 first housing part
3 second housing part
4 plug connector module
5 rear groove
6 front groove
7 contact element
8 bearing surface
9 web
10 fixing arms
11 pressure plate
12 abutment surface
13 fixing hooks
14 guide webs
15 screw orifice
16 threaded orifice
S plug-in side
A terminal side

The invention claimed is:

1. A modular circuit board plug connector (1), comprising
a first housing part (2) and a second housing part (3) which can be joined together to form a plug connector housing;
at least two plug connector modules (4, 4'); and
fixing arms (10), arranged on narrow sides of the modular circuit board plug connector (1), by which the modular circuit board plug connector (1) can be fixed reversibly to a mating plug connector arranged on a circuit board, wherein the plug connector modules (4, 4') are retained in the plug connector housing in a pluggable fashion by the first housing part (2) and the second housing part (3) when joined together, wherein, on a terminal side, the fixing arms (10) each have a pressure plate (11), and wherein the pressure plates (11) can be pressed toward each other, whereby the modular circuit board plug connector can be unlocked from the mating plug connector and separated therefrom.

2. The modular circuit board plug connector (1) as claimed in claim 1, wherein the plug connector modules (4, 4') have an essentially cuboid design and have at least one groove (5, 6) in each case on two opposite surfaces.

3. The modular circuit board plug connector (1) as claimed in claim 1, wherein the plug connector modules (4, 4') have an essentially cuboid design and have a rear groove (5) and a front groove (6) in each case on two opposite surfaces, the rear groove (5) and the front groove (6) being parallel to one another.

4. The modular circuit board plug connector as claimed in claim 2, wherein the first housing part (2) and the second housing part (3) each have a continuous web (9') and/or segmented web (9) on a plug-in side.

5. The modular circuit board plug connector as claimed in claim 4, wherein the webs (9, 9') of the first housing part (2) and the second housing part (3) each engage in the at least one groove (5, 6) of the respective plug connector modules (4, 4') such that the plug connector modules (4, 4') are retained by the first housing part (2) and the second housing part (3) which are joined together in a pluggable fashion.

6. The modular circuit board plug connector as claimed in claim 1, wherein the fixing arms (10) are integrally formed on the second housing part (3).

7. The modular circuit board plug connector as claimed in claim 1, wherein the fixing arms (10) are integrally formed on the plug connector housing so that they can move orthogonally to a plug-in direction.

8. The modular circuit board plug connector as claimed in claim 1, wherein the first housing part (2) and the second housing part (3) are made of plastic.

* * * * *